(12) United States Patent
Kitamura et al.

(10) Patent No.: US 8,986,553 B2
(45) Date of Patent: Mar. 24, 2015

(54) METHOD FOR MANUFACTURING OPTICAL SEMICONDUCTOR DEVICE

(71) Applicant: Sumitomo Electric Industries, Ltd., Osaka-shi, Osaka (JP)

(72) Inventors: Takamitsu Kitamura, Fujisawa (JP); Hideki Yagi, Machida (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 77 days.

(21) Appl. No.: 13/935,704

(22) Filed: Jul. 5, 2013

(65) Prior Publication Data

US 2014/0021160 A1 Jan. 23, 2014

(30) Foreign Application Priority Data

Jul. 19, 2012 (JP) ................................. 2012-160776

(51) Int. Cl.
*B29D 11/00* (2006.01)
*G02F 1/225* (2006.01)
*G02F 1/21* (2006.01)

(52) U.S. Cl.
CPC ........ *B29D 11/00673* (2013.01); *G02F 1/2257* (2013.01); *G02F 2001/212* (2013.01)
USPC ........................... 216/2; 385/2; 385/3; 385/14

(58) Field of Classification Search
CPC ............ G02F 1/2257; G02F 2001/212; B29D 11/00673; G02B 2006/12159; G02B 6/1225
USPC ........................................ 216/2; 385/2, 3, 14
See application file for complete search history.

(56) References Cited

PUBLICATIONS

K. Tsuzuki et al., "40 Gbit/s n-i-n InP Mach-Zehnder modulator with a π voltage of 2.2V", Electronics Letters, vol. 39, No. 20, Oct. 2, 2003, 2 sheets.

*Primary Examiner* — Duy Deo
*Assistant Examiner* — Mahmoud Dahimene
(74) *Attorney, Agent, or Firm* — Smith, Gambrell & Russell LLP

(57) ABSTRACT

A method for manufacturing an optical semiconductor device includes the steps of preparing a substrate product including a semiconductor layer, a mesa structure, and a protective layer; forming a buried layer composed of a resin on the substrate product; forming a first opening in the buried layer on the mesa structure; forming a second opening in the buried layer on the semiconductor layer; exposing the mesa structure and the semiconductor layer by etching the protective layer; forming a first electrode in the first opening; and forming a second electrode in the second opening. The step of forming the second opening includes a first etching step including etching the buried layer using a first resist mask for forming a recess and a second etching step including etching the buried layer using a second resist mask having an opening pattern which has an opening width not smaller than that of the recess.

13 Claims, 14 Drawing Sheets

METHOD FOR MANUFACTURING OPTICAL SEMICONDUCTOR DEVICE

BACKGROUND OF THE INVENTION

1. Field of the Invention

The present invention relates to a method for manufacturing an optical semiconductor device, and more particularly, to a method for manufacturing a Mach-Zehnder modulator.

2. Description of the Related Art

Mach-Zehnder modulators having a high-mesa-shaped semiconductor optical waveguide which is embedded with a resin such as a benzocyclobutene (BCB) resin, are known.

Non-Patent Document 1 (K. Tsuzuki, T. Ishibashi, T. Ito, S. Oku, Y. Shibata, R. Iga, Y. Kondo and Y. Tohmori, 40 Gbit/s n-i-n InP Mach-Zehnder modulator with a π voltage of 2.2 V, Electronics Letters Online 2nd, October 2003, Vol. 39 No. 20) describes a Mach-Zehnder modulator. This Mach-Zehnder modulator includes a high-mesa-shaped semiconductor optical waveguide disposed on a semiconductor substrate. The sidewall of the semiconductor optical waveguide is buried in a benzocyclobutene (BCB) resin.

SUMMARY OF THE INVENTION

In an optical semiconductor device having a high-mesa-shaped semiconductor optical waveguide (hereinafter, referred to as a "mesa structure"), the mesa structure is disposed on a substrate, and the mesa structure is embedded with a buried layer composed of a resin. In such an optical semiconductor device, an electrode for applying a voltage to the optical semiconductor device is provided on the upper surface of the mesa structure. When the substrate is formed of a semi-insulating semiconductor such as Fe-doped InP, another electrode is provided on the principal surface of the substrate. Furthermore, an electric wiring line (or electrode pad) for allowing connection to the electrode provided on the upper surface of the mesa structure and an electric wiring line (or electrode pad) for allowing connection to the electrode provided on the principal surface of the substrate are disposed on the surface of the buried layer. In order to provide these electrodes on the upper surface of the mesa structure and on the principal surface of the substrate, it is necessary to form openings in the buried layer. However, the openings each have different depths from the surface of the buried layer.

A method for manufacturing an optical semiconductor device according to an aspect of the present invention includes the steps of preparing a substrate product including a semiconductor layer, a mesa structure disposed on a principal surface of the semiconductor layer, and a protective layer, the protective layer being formed on the principal surface of the semiconductor layer, a side surface of the mesa structure, and an upper surface of the mesa structure; forming a buried layer composed of a resin on the substrate product; forming a first opening in the buried layer on the mesa structure by etching the buried layer; forming a second opening in the buried layer on the semiconductor layer by etching the buried layer; exposing the upper surface of the mesa structure and the principal surface of the semiconductor layer by etching the protective layer; forming a first electrode in the first opening, the first electrode extending from the surface of the buried layer to the upper surface of the mesa structure; and forming a second electrode in the second opening, the second electrode extending from the surface of the buried layer to the principal surface of the semiconductor layer. Furthermore, the step of forming the second opening includes a first etching step and a second etching step. The first etching step includes steps of forming a first resist mask having an opening pattern for forming a recess in the buried layer on the semiconductor layer, etching the buried layer using the first resist mask, and removing the first resist mask. The second etching step includes steps of, after the first etching step, forming a second resist mask having an opening pattern which has an opening width not smaller than an opening width of the recess, the recess being exposed through the opening pattern of the second resist mask, etching the buried layer using the second resist mask, and removing the second resist mask.

In the optical semiconductor device manufactured by this manufacturing method, the thickness of the buried layer from the surface of the buried layer to the principal surface of the semiconductor substrate is larger than the thickness of the buried layer from the surface of the buried layer to the upper surface of the mesa structure. In the step of forming the second opening, the thickness of the first resist mask is decreased by the etching for forming the recess. After removing the first resist mask whose thickness has been decreased, the second resist mask is formed, and the buried layer is etched again. Therefore, even when a buried layer composed of a resin is etched using a resist mask, it is possible to form a second opening that is deeper than the first opening. Consequently, it is possible to form the second electrode in the second opening so as to be connected to the semiconductor layer through the second opening. Furthermore, the opening pattern of the second resist mask has an opening width not smaller than the opening width of the recess. Since the opening width of the second resist mask is larger than the opening width of the recess, the side surface surrounding the second opening is inclined with respect to the depth direction of the second opening. Therefore, it is possible to suppress the occurrence of connection failure of the second electrode.

Furthermore, in the method for manufacturing an optical semiconductor device according to the present invention, the second resist mask may have the opening width of the opening pattern that is set to be larger, in the range of 2 μm to 20 μm, than an opening width of the opening pattern of the first resist mask. With this setting, it is possible to form a second resist mask having an opening width that is larger than the opening width of the recess.

Furthermore, in the method for manufacturing an optical semiconductor device according to the present invention, preferably, the second resist mask is formed using the same photomask as that for forming the first resist mask, and the exposure amount at the time of forming the second resist mask is larger than the exposure amount at the time of forming the first resist mask. In accordance with this manufacturing method, the second resist mask can be formed using the same photomask as that for forming the first resist mask only by changing the exposure amount at the time of performing exposure on the resist.

Furthermore, in the method for manufacturing an optical semiconductor device according to the present invention, preferably, the buried layer is composed of a benzocyclobutene resin, and the first resist mask is composed of a material which does not contain silicon or a material having a lower silicon content than the benzocyclobutene. Furthermore, preferably, in the first etching step, the step of etching the buried layer further includes steps of forming the recess by selectively etching the buried layer, using the first resist mask, by a reactive ion etching method using an etching gas containing $CF_4$ and $O_2$ at a first mixing ratio, increasing the opening width of the opening pattern of the first resist mask by selectively etching a portion of the first resist mask with the mixing ratio of the etching gas containing $CF_4$ and $O_2$ being changed to a second mixing ratio that is different from the first mixing ratio, and selectively etching the buried layer, after increasing the opening width of the opening pattern of the first resist mask, with the mixing ratio of the etching gas containing $CF_4$ and $O_2$ being changed to a third mixing ratio that is different from the second mixing ratio.

In this manufacturing method, by controlling the gas mixing ratio of $CF_4$ to $O_2$ contained in the etching gas in the RIE process, the etching rates can be controlled such that the etching rate of the resist mask is lower than the etching rate of the buried layer. In this case, the buried layer is selectively etched so that the recess is formed by using the first resist mask, for example. On the other hand, by controlling the gas mixing ratio of $CF_4$ to $O_2$ contained in the etching gas, the etching rates can be also controlled such that the etching rate of the buried layer is lower than the etching rate of the resist mask. In this case, the resist mask is selectively etched so that the opening width of the opening pattern of the first resist mask is increased. Preferably, the first mixing ratio and the third mixing ratio of $CF_4$ to $O_2$ are set in a range of 4:5 to 1:1, and the second mixing ratio of $CF_4$ to $O_2$ is set in a range of 1:3 to 1:5, in terms of the partial pressure ratio.

Furthermore, in the method for manufacturing an optical semiconductor device according to the present invention, preferably, the buried layer is composed of a benzocyclobutene resin, and the second resist mask is composed of a material which does not contain silicon or a material having a lower silicon content than the benzocyclobutene. Furthermore, preferably, in the second etching step, the step of etching the buried layer further includes the steps of selectively etching the buried layer, using the second resist mask, by a reactive ion etching method using an etching gas containing $CF_4$ and $O_2$ at a fourth mixing ratio, increasing the opening width of the opening pattern of the second resist mask by selectively etching a portion of the second resist mask with the mixing ratio of the etching gas containing $CF_4$ and $O_2$ being changed to a fifth mixing ratio that is different from the fourth mixing ratio, and selectively etching the buried layer, after increasing the opening width of the opening pattern of the second resist mask, with the mixing ratio of the etching gas containing $CF_4$ and $O_2$ being changed to a sixth mixing ratio that is different from the fifth mixing ratio. Preferably, the fourth mixing ratio and the sixth mixing ratio of $CF_4$ to $O_2$ are set in a range of 4:5 to 1:1, and the fifth mixing ratio of $CF_4$ to $O_2$ is set in a range of 1:3 to 1:5, in terms of the partial pressure ratio.

Furthermore, in the method for manufacturing an optical semiconductor device according to the present invention, preferably, the second opening has a depth measured from the surface of the buried layer to the principal surface of the semiconductor layer larger than a depth measured from the surface of the buried layer to the upper surface of the mesa structure of the first opening.

Furthermore, in the method for manufacturing an optical semiconductor device according to the present invention, preferably, the optical semiconductor device includes a Mach-Zehnder modulator having a first waveguide and a second waveguide, the first waveguide and the second waveguide including the mesa structure. Preferably, the step of preparing the substrate product includes steps of growing a stacked semiconductor layer including a first cladding layer, a core layer, and a second cladding layer, and forming the first waveguide and the second waveguide of the Mach-Zehnder modulator by etching the stacked semiconductor layer. The protective layer is preferably composed of silicon oxide. Furthermore, preferably, the semiconductor layer and the first cladding are each composed of n-type InP, the core layer is composed of AlGaInAs, and the second cladding layer is composed of p-type InP.

Furthermore, a method for manufacturing an optical semiconductor device according to another aspect of the present invention includes the steps of preparing a substrate product including a semiconductor layer, a mesa structure disposed on a principal surface of the semiconductor layer, and a protective layer, the protective layer being formed on the principal surface of the semiconductor layer, a side surface of the mesa structure, and an upper surface of the mesa structure; forming a buried layer composed of a resin on the substrate product; forming a first resist mask having opening patterns for forming a first opening in the buried layer on the mesa structure and a recess in the buried layer on the semiconductor layer, forming the first opening and the recess by etching the buried layer using the first resist mask; forming a second opening in the buried layer on the semiconductor layer by etching the buried layer; exposing the upper surface of the mesa structure and the principal surface of the semiconductor layer by etching the protective layer; forming a first electrode in the first opening, the first electrode extending from the surface of the buried layer to the upper surface of the mesa structure; and forming a second electrode in the second opening, the second electrode extending from the surface of the buried layer to the principal surface of the semiconductor layer. Furthermore, the step of forming the second opening includes steps of forming a second resist mask having an opening pattern which has an opening width not smaller than an opening width of the recess, the recess being exposed through the opening pattern of the second resist mask, etching the buried layer using the second resist mask, and removing the second resist mask.

In this manufacturing method, it is possible to form the second electrode which is connected to the semiconductor layer at a position deeper than that of the first electrode. Furthermore, since the first opening and the recess for the second opening are formed simultaneously, an etching process in the step of forming the second opening can be simplified.

DESCRIPTION OF THE PREFERRED EMBODIMENTS

Figure 1:
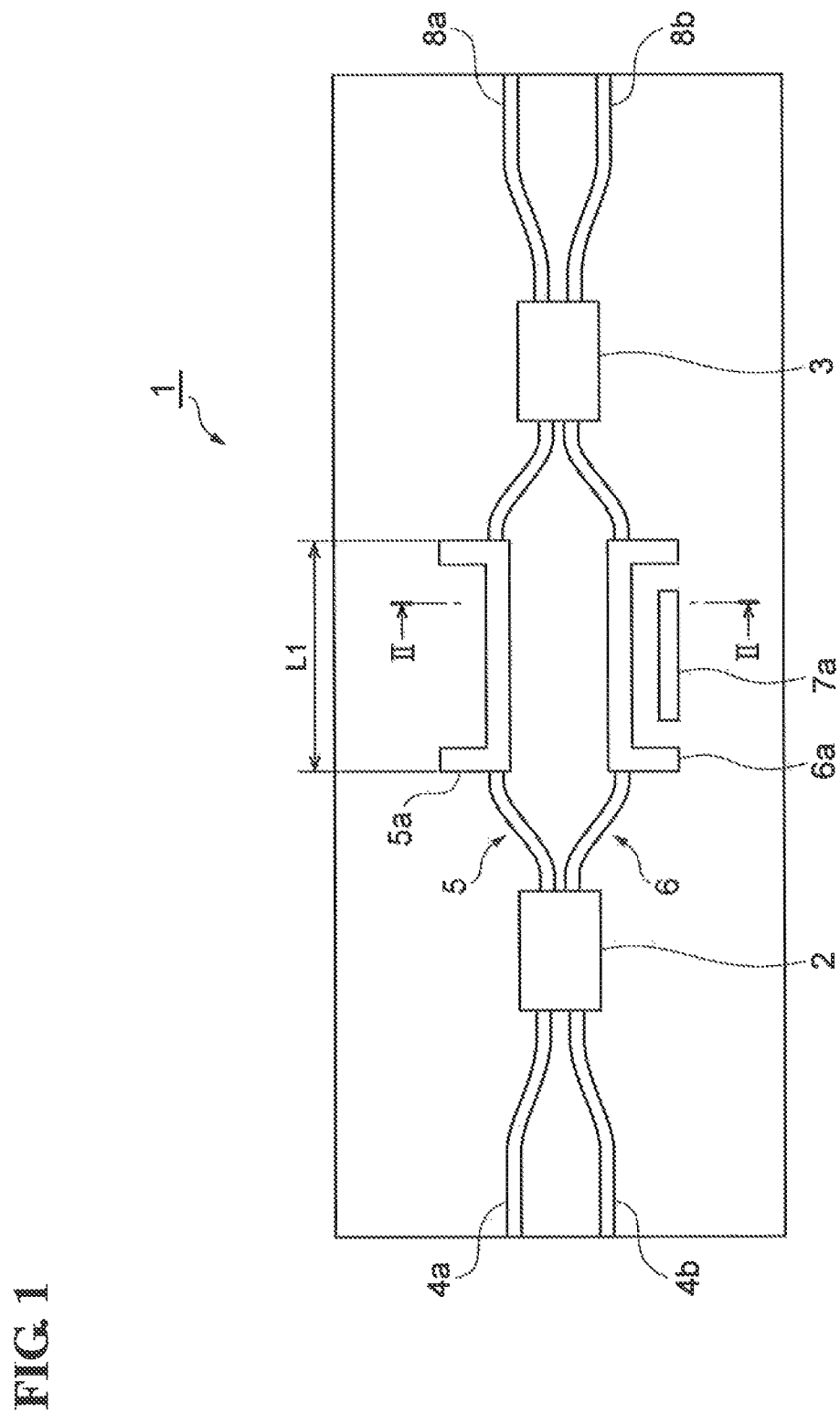
FIG. 1 is a view showing a structure of a Mach-Zehnder modulator.

Embodiments of a method for manufacturing an optical semiconductor device of the present invention will be described in details with reference to the attached drawings. In the drawings, the same components are designated by the same reference numerals, and duplicate descriptions are omitted.

First Embodiment

A method for manufacturing an optical semiconductor device according to a first embodiment will be described. In this embodiment, a method for manufacturing a Mach-Zehnder modulator will be described as the optical semiconductor device.

Figure 2:
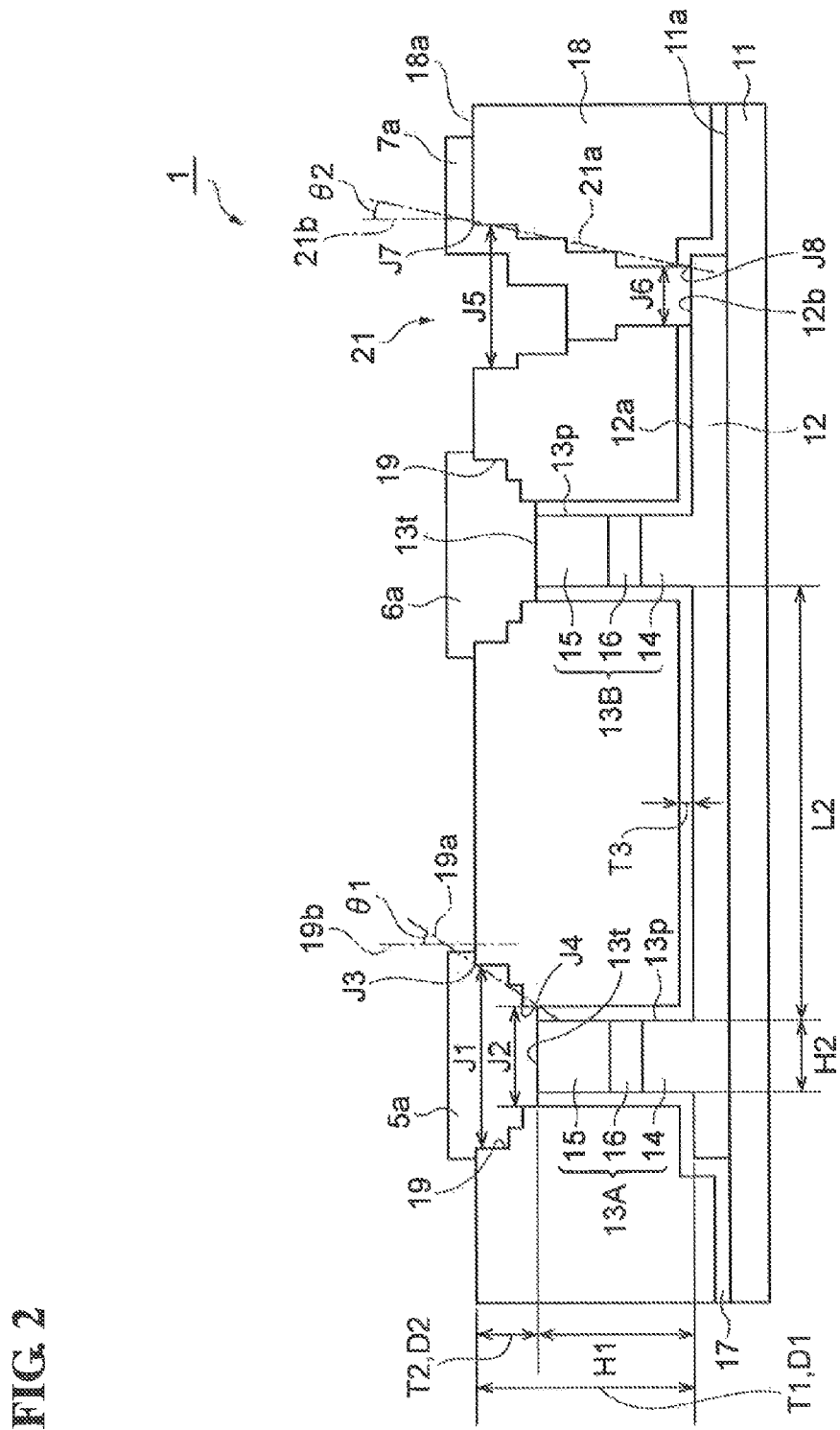
FIG. 2 is a view showing an end face taken along the line II-II of FIG. 1.

First, a structure of a Mach-Zehnder modulator will be described. FIG. 1 is a view showing a structure of a Mach-Zehnder modulator 1. FIG. 2 is a schematic cross-sectional view of the Mach-Zehnder modulator 1 taken along line II-II in FIG. 1. The Mach-Zehnder modulator 1 is a device used for constituting an optical communication network. Furthermore, the Mach-Zehnder modulator 1 is an optical semiconductor device having a function of controlling the optical phase by electrical signals so that light propagating through the Mach-Zehnder modulator 1 is modulated with the electrical signals.

As shown in FIG. 1, the Mach-Zehnder modulator 1 includes optical couplers 2 and 3. Optical waveguides 4a and 4b are optically connected to the optical coupler 2. Light input from the optical waveguides 4a and 4b propagates to the optical coupler 2. The optical coupler 2 and the optical coupler 3 are connected to each other by a first waveguide 5 and a second waveguide 6. Optical waveguides 8a and 8b are connected to the optical coupler 3. A modulated light is output from the optical waveguides 8a and 8b to the outside of the Mach-Zehnder modulator 1

The optical coupler 2 splits signal light into two split beams. The optical coupler 3 combines two split beams to generate signal light which is modulated with the electrical signals. As the optical couplers 2 and 3, for example, multimode interference (MMI) couplers can be used.

A first electrode 5a is disposed on the first waveguide 5, and a first electrode 6a is disposed on the second waveguide 6. The electrode length L1 of each of the first electrodes 5a and 6a is, for example, 1.5 mm. The electrode length is defined as the length of each of the first electrodes 5a and 6a measured in a direction in which each of the first waveguide 5 and the second waveguide 6 extends.

A second electrode 7a is disposed in the vicinity of the first electrode 6a. The second electrode 7a is separated from the first electrode 6a in a direction perpendicular to the direction in which the first electrode 6a extends, and extends in a direction in which the first electrode 6a extends.

In the Mach-Zehnder modulator 1, input light is split into two split beams by the optical coupler 2, and the split beams are guided to the first waveguide 5 and the second waveguide 6. By applying a voltage to one of the first electrode 5a and the first electrode 6a, the phase of one of the split beams is changed. The two split beams are then combined by the optical coupler 3 and output from the optical waveguides 8a and 8b. An intensity of output light from the optical waveguides 8a and 8b is modulated due to the interference between the two beams guiding through the first waveguides 5 and 6.

As shown in FIG. 2, the Mach-Zehnder modulator 1 includes a semi-insulating semiconductor substrate 11 and a semiconductor layer 12 disposed on a principal surface 11a of the semiconductor substrate 11. The semiconductor substrate 11 is composed of a III-V group compound semiconductor, such as Fe-doped InP. The semiconductor layer 12 is composed of a III-V group compound semiconductor, such as n-type (first conductivity type) InP.

A mesa structure 13A constituting the first waveguide 5 and a mesa structure 13B constituting the second waveguide 6 are disposed on a principal surface 12a of the semiconductor layer 12. The height H1 of each of the mesa structures 13A and 13B is set in the range of 2.0 μm to 5.0 μm. The height H1 of each of the mesa structures 13A and 13B is defined by the length from the principal surface 12a of the semiconductor layer 12 to an upper surface 13t of each of the mesa structures 13A and 13B. Furthermore, the width H2 of each of the mesa structures 13A and 13B is set in the range of 0.5 μm to 3.0 μm. The mesa structure 13A is separated from the mesa structure 13B with a distance L2 of 10 μm to 200 μm in a direction perpendicular to the direction in which the mesa structure 13A extends. Note that the mesa structure 13B has the same structure as that of the mesa structure 13A.

The mesa structure 13A includes a first cladding layer 14, a second cladding layer 15, and a core layer 16 disposed between the first cladding layer 14 and the second cladding layer 15. The first cladding layer 14 is constituted by a part of the semiconductor layer 12 and is composed of a III-V group compound semiconductor, such as n-type (first conductivity type) InP. The core layer 16 is disposed on the first cladding layer 14 and is composed of a III-V group compound semiconductor, such as AlGaInAs. The second cladding layer 15 is disposed on the core layer 16 and is composed of a III-V group compound semiconductor, such as p-type (second conductivity type) InP.

A side surface 13p of the mesa structure 13A, the principal surface 12a of the semiconductor layer 12, and the principal surface 11a of the semiconductor substrate 11 are covered with a protective layer 17. The protective layer 17 has a thickness T3 of 0.05 μm to 1.0 μm. The protective layer 17 is a dielectric film composed of silicon oxide, silicon nitride, or the like. The upper surfaces 13t of the mesa structures 13A and 13B are exposed from the protective layer 17. A portion 12b of the principal surface 12a of the semiconductor layer 12 is also exposed from the protective layer 17. That is, openings for forming electrodes are provided in the protective layer 17 in the regions corresponding to the upper surfaces 13t of the mesa structures 13A and 13B, and the portion 12b of the principal surface 12a of the semiconductor layer 12. Furthermore, the portion 12b of the principal surface 12a of the semiconductor layer 12 is provided in a region on the principal surface 12a excluding portions on which the mesa structures 13A and 13B are provided.

The mesa structures 13A and 13B are embedded within a buried layer 18. Because layer 18 embeds or buries mesa structures 13A and 13B, layer 18 will be referred to as the "buried layer" herein. The buried layer 18 is composed of a resin having a low dielectric constant, such as a benzocyclobutene (BCB) resin. The buried layer 18 covers the principal surface 11a of the semiconductor substrate 11, the principal surface 12a of the semiconductor layer 12, and the side surfaces 13p of the mesa structures 13A and 13B. In the buried layer 18, a surface 18a of the buried layer 18 is located at a higher position of a thickness T2 from the upper surface 13t of the mesa structure 13A or 13B. Therefore, the side surfaces 13p of the mesa structures 13A and 13B are fully buried with the buried layer 18. In addition, the surface 18a of the buried layer 18 is located at a position of a thickness T1 from the principal surface 12a of the semiconductor layer 12. The thickness T1 is obtained by adding the thickness T2 and the height H1 of each of the mesa structures 13A and 13B. The surface 18a of the buried layer 18 has a roughly flat surface.

The buried layer 18 has first openings 19 in which the first electrodes 5a and 6a are to be provided. The first openings 19 have a depth D2 of 0.5 µm to 5.0 µm, which is defined by the length measured from the surface 18a of the buried layer 18 to the upper surface 13t of each of the mesa structures 13A and 13B. The depth D2 is equal to the thickness T2 of the buried layer 18. Furthermore, the opening width J1 of the first opening 19 on the surface 18a side of the buried layer 18 is set in the range of 4.5 µm to 11.0 µm. The opening width J2 of the first opening 19 at the side where the upper surface 13t of the mesa structure 13A or 13B is exposed is set in the range of 0.6 µm to 5.0 µm. That is, the side surface of the first opening 19 is inclined from the upper surface 13t toward the surface 18a such that the opening width increases. The angle θ1 between an imaginary side surface 19a of the first opening 19 and a direction 19b from the upper surface 13t toward the surface 18a is set in the range of 40 degrees to 70 degrees. The imaginary side surface 19a corresponds to a surface which connects an edge J3 of the opening width J1 and an edge J4 of the opening width J2.

A conductive material constituting the first electrodes 5a and 6a is disposed in the first openings 19. Each of the first electrodes 5a and 6a has a portion ohmically connected to the upper surface 13t of the mesa structure 13A or 13B, a portion in contact with the side surface 19a of the first opening 19, and a portion in contact with the surface 18a of the buried layer 18. The first electrodes 5a and 6a are, for example, composed of Ti/Pt/Au.

The buried layer 18 has a second opening 21 for providing the second electrode 7a. The second opening 21 has a depth D1 of 2.5 µm to 10 µm, which is defined by the length measured from the surface 18a of the buried layer 18 to the portion 12b of the semiconductor layer 12. For example, the depth D1 can be set at about 6 µm. The depth D1 is equal to the thickness T1 of the buried layer 18. The depth D1 of the second opening 21 is larger than the depth D2 of the first openings 19. Furthermore, the opening width J5 of the second opening 21 on the surface 18a side of the buried layer 18 is set in the range of 2.0 µm to 220 µm. The opening width J6 of the second opening 21 at the side where the portion 12b of the semiconductor layer 12 is exposed is set in the range of 1.0 µm to 200 p.m. That is, the side surface of the second opening 21 is inclined from the portion 12b toward the surface 18a such that the opening width increases. The angle θ2 between an imaginary side surface 21a of the second opening 21 and a direction 21b from the portion 12b toward the surface 18a is set in the range of 40 degrees to 80 degrees. The imaginary side surface 21a corresponds to a surface which connects an edge J7 of the opening width J5 and an edge J8 of the opening width J6.

A conductive material constituting the second electrode 7a is disposed in the second opening 21. The second electrode 7a has a portion ohmically connected to the portion 12b of the semiconductor layer 12, a portion in contact with the side surface 21a of the second opening 21, and a portion in contact with the surface 18a of the buried layer 18. The second electrode 7a is, for example, composed of AuGeNi/Au.

In the Mach-Zehnder modulator 1 described above, the mesa structure 13A serving as the first waveguide 5 and the mesa structure 13B serving as the second waveguide 6 are embedded in a resin having a low dielectric constant. As the resin having a low dielectric constant, for example, a BCB resin can be used. The relative dielectric constant of BCB is about 2.50 to 2.65. By embedding the mesa structure 13A and the mesa structure 13B in the resin having such a low dielectric constant, parasitic capacitances in the vicinity of the first electrodes 5a and 6a and the second electrode 7a are reduced. As a result, frequency characteristics of the Mach-Zehnder modulator 1 can be improved.

Figure 3:
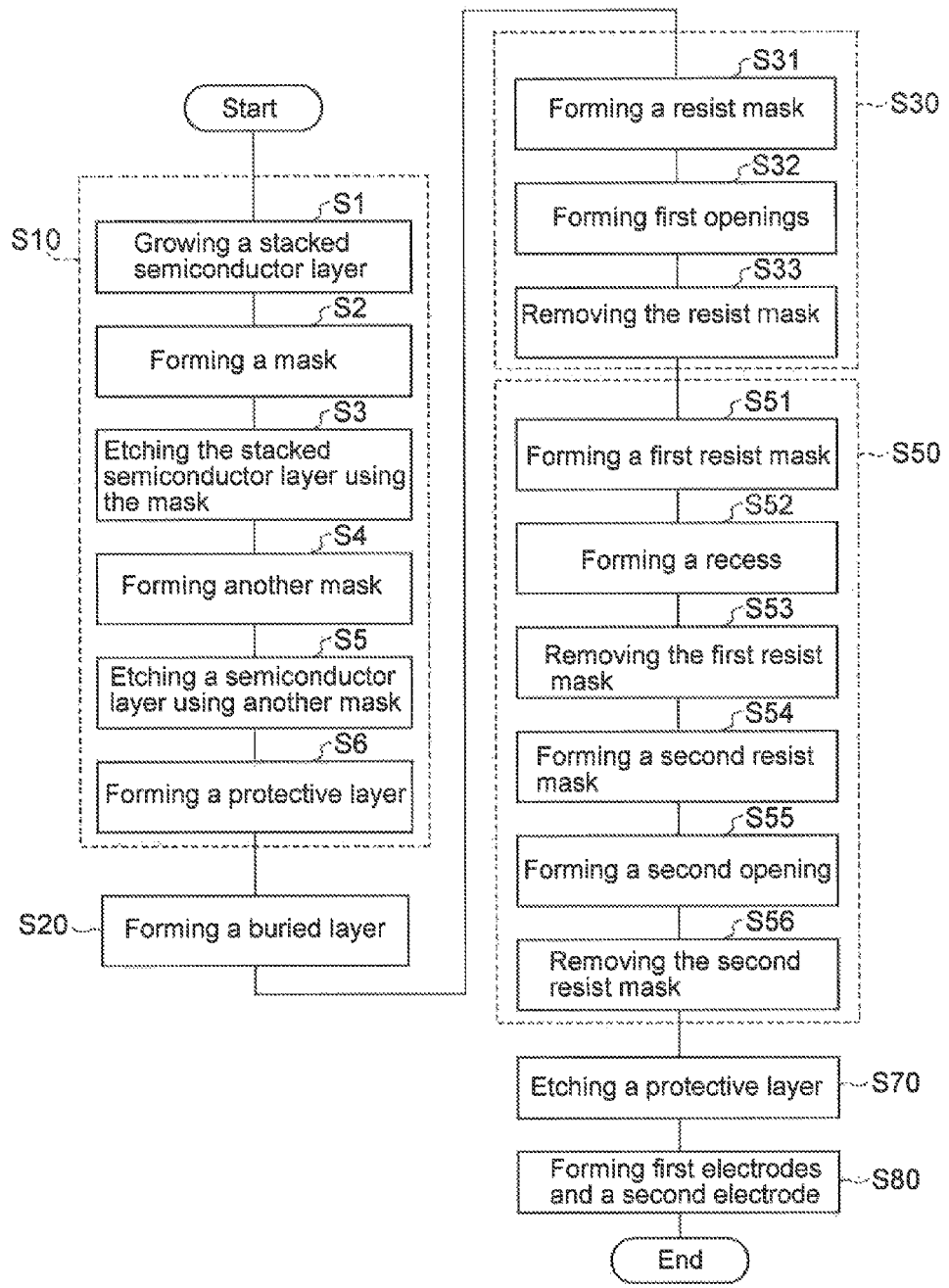
FIG. 3 is a diagram showing major steps in a method for manufacturing an optical semiconductor device according to a first embodiment.

A method for manufacturing a Mach-Zehnder modulator 1 will be described below. FIG. 3 is a diagram showing major steps in a method for manufacturing an optical semiconductor device according to the first embodiment. The method for manufacturing an optical semiconductor device according to the first embodiment includes a first step S10 of preparing a substrate product, a second step S20 of forming a buried layer, a third step S30 of forming a first opening 19, a fourth step S50 of forming a second opening 21, a fifth step S70 of etching a protective layer 17, and a sixth step S80 of forming first electrodes 5a and 6a and a second electrode 6a.

Figure 4A:
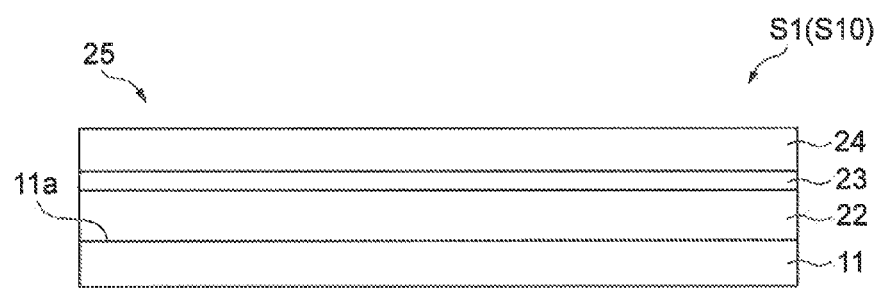
FIGS. 4A to 4C are views for illustrating the method for manufacturing an optical semiconductor device according to the first embodiment.

In step S1, as shown in FIG. 4A, a stacked semiconductor layer including a semiconductor layer 22 for forming a semiconductor layer 12 and a first cladding layer 14, a semiconductor layer 23 for forming a core layer 16, and a semiconductor layer 24 for forming a second cladding layer 15 is grown in that order on a principal surface 11a of a semi-insulating semiconductor substrate 11. By step S1, a substrate product 25 in which the semiconductor layers 22, 23, and 24 are stacked on the semiconductor substrate 11 is produced. In order to grow the semiconductor layers 22, 23, and 24, for example, an organo-metallic vapor phase epitaxy (OMVPE) can be used. The semiconductor layer 22 is composed of a III-V group compound semiconductor, such as n-type InP. The semiconductor layer 23 is composed of a III-V group compound semiconductor, such as AlGaInAs. The semiconductor layer 24 is composed of a III-V group compound semiconductor, such as p-type InP.

Figure 4B:
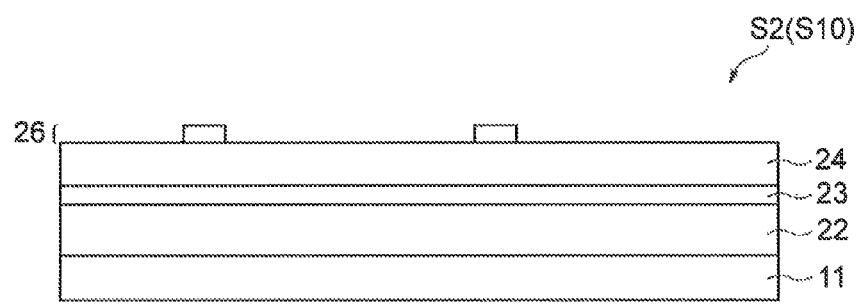

In step S2, as shown in FIG. 4B, an insulating layer mask 26 for etching the semiconductor layers 22, 23, and 24 are formed. Note that, in this embodiment, resist masks and insulating layer masks each include a mask portion which covers a region not to be etched and an opening pattern which exposes a region to be etched.

First, an insulating layer composed of a dielectric film, such as silicon oxide ($SiO_2$) or silicon nitride (SiN), is formed by a chemical vapor deposition (CVD) method on the semiconductor layer 24 of the substrate product 25. Next, a resist is applied onto the insulating layer using a spin coating method. Then, a resist mask having a predetermined opening pattern is formed using a photolithography technique. The resist mask has a mask portion which covers a region on which mesa structures 13A and 13B are formed. Consequently, in the region other than the mask portion, the surface of the insulating layer is exposed.

Next, etching is performed on the insulating layer using the resist mask. The opening pattern of the resist mask is transferred to the insulating layer by the etching, and an insulating layer mask 26 is formed. In the etching, for example, a reactive ion etching (RIE) method using $CF_4$ as an etching gas can be used. Then, the resist mask is removed by ashing with $O_2$ or using an organic solvent.

Figure 4C:
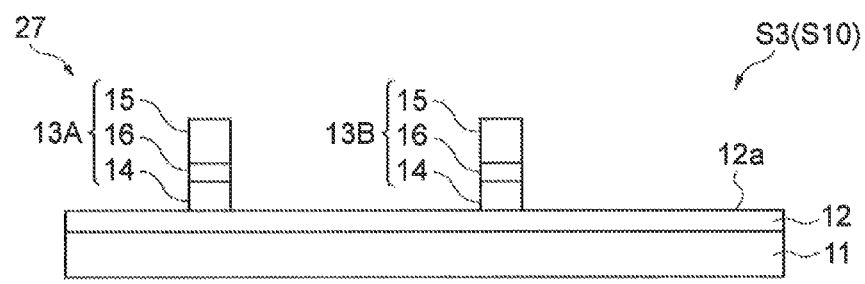

In step S3, as shown in FIG. 4C, etching is performed on the semiconductor layers 22, 23, and 24 using the insulating layer mask 26. Mesa structures 13A and 13B are formed by the etching. The mesa structures 13A and 13B are included in first and second waveguides 5 and 6, respectively.

In the etching, for example, dry etching, such as RIE, can be used. The etched semiconductor layer 22 constitutes the semiconductor layer 12 and a first cladding layer 14. The etched semiconductor layer 23 constitutes a core layer 16. The etched semiconductor layer 24 constitutes a second cladding layer 15. Subsequently, the insulating layer mask 26 is removed. In order to remove the insulating layer mask 26, for example, buffered hydrofluoric acid can be used.

By carrying out the steps S1 to S3 described above, a substrate product 27 having the mesa structure 13A constituting the first waveguide 5 and the mesa structure 13B constituting the second waveguide 6 can be obtained.

Figure 5A:
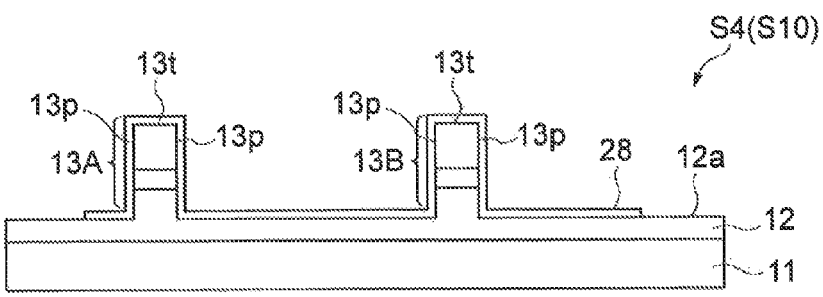
FIGS. 5A to 5C are views for illustrating the method for manufacturing an optical semiconductor device according to the first embodiment.

In step S4, as shown in FIG. 5A, an insulating layer mask 28 for etching a portion of the semiconductor layer 12 is formed. An insulating layer composed of a dielectric film, for example, $SiO_2$ or SiN, which covers the principal surface 12a of the semiconductor layer 12 and the upper surfaces 13t and side surfaces 13p of the mesa structures 13A and 13B, is formed by a CVD method. Next, a resist is applied onto the insulating layer using a spin coating method. Then, a resist mask having a predetermined opening pattern is formed using a photolithography technique. Subsequently, etching is performed on the insulating layer by an RIE method using the resist mask. The opening pattern of the resist mask is transferred to the insulating layer by the etching, and the insulating layer mask 28 is formed. Then, the resist mask is removed by ashing with $O_2$ or using an organic solvent.

Figure 5B:
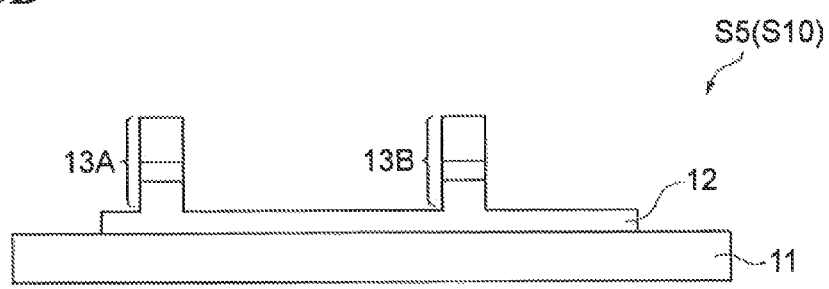

In step S5, as shown in FIG. 5B, portions of the semiconductor layer 12 are etched using the insulating layer mask 28. Adjacent substrate products 27 are electrically isolated by the etching. In step S5, first, portions of the semiconductor layer 12 are etched by an RIE method using the insulating layer mask 28. Then, the insulating layer mask 28 is removed.

Figure 5C:
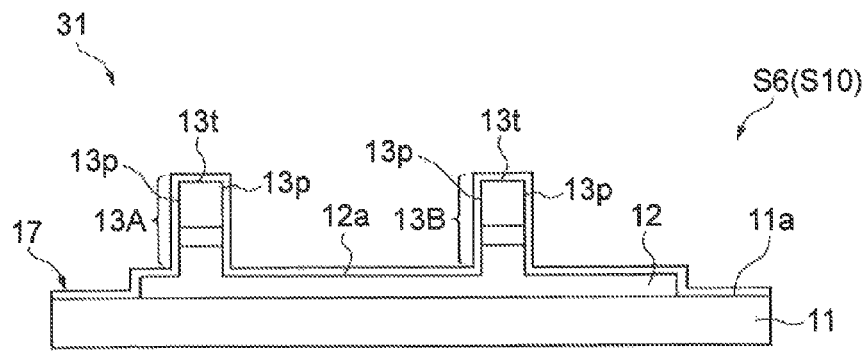

In step S6, as shown in FIG. 5C, a protective layer 17 for protecting the principal surface 11a of the semi-insulating semiconductor substrate 11, the principal surface 12a of the semiconductor layer 12, the upper surfaces 13t and side surfaces 13p of the mesa structures 13A and 13B is formed. The protective layer 17 is, for example, composed of a dielectric material, such as silicon oxide ($SiO_2$) or silicon nitride (SiN), with a thickness of 0.05 µm to 1.0 µm. In order to form the protective layer 17, for example, a CVD method can be used.

By carrying out the steps S1 to S6 described above, a substrate product 31 is prepared, which includes the semi-insulating semiconductor substrate 11, the semiconductor layer 12 disposed on the semiconductor substrate 11, the mesa structures 13A and 13B disposed on the principal surface 12a of the semiconductor layer 12, and the insulating protective layer 17 which covers the principal surface 12a of the semiconductor layer 12, the side surfaces 13p and upper surfaces 13t of the mesa structures 13A and 13B. Note that, the first step S10 of preparing the substrate product 31 in this embodiment includes the steps S1 to S6 described above (refer to FIG. 3).

Figure 6A:
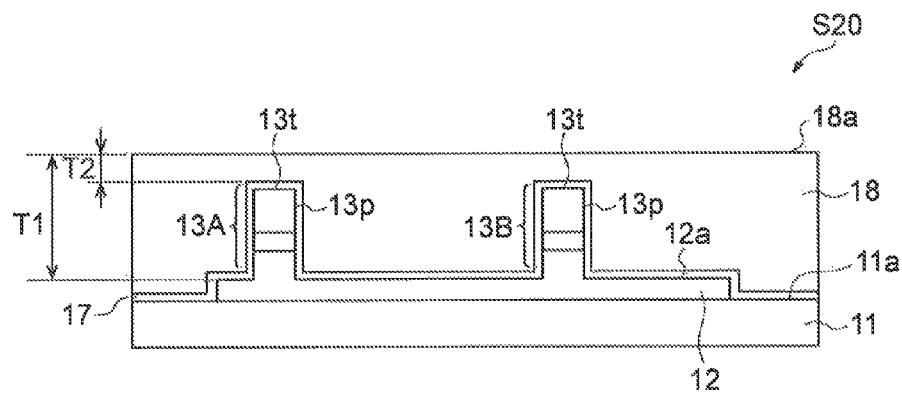
FIGS. 6A to 6C are views for illustrating the method for manufacturing an optical semiconductor device according to the first embodiment.

In step S20, as shown in FIG. 6A, a buried layer 18 is formed by applying a resin onto the substrate product 31. The buried layer 18 is composed of a resin material containing silicon and having a low dielectric constant, such as a BCB resin. The buried layer 18 is applied onto the protective layer 17, for example, by a spin coating method such that the principal surface 11a of the semiconductor substrate 11, the principal surface 12a of the semiconductor layer 12, and the upper surfaces 13t and side surfaces 13p of the mesa structures 13A and 13B are embedded. The applied BCB resin is hardened by thermal curing processing.

The thickness T1 from the surface 18a of the buried layer 18 to the principal surface 12a of the semiconductor layer 12 can be set, for example, at 2.5 µm to 10 µm. The thickness T2 from the surface 18a of the buried layer 18 to the upper surface 13t of each of the mesa structures 13A and 13B can be set, for example, at 0.55 µm to 6.0 µm.

Figure 6B:
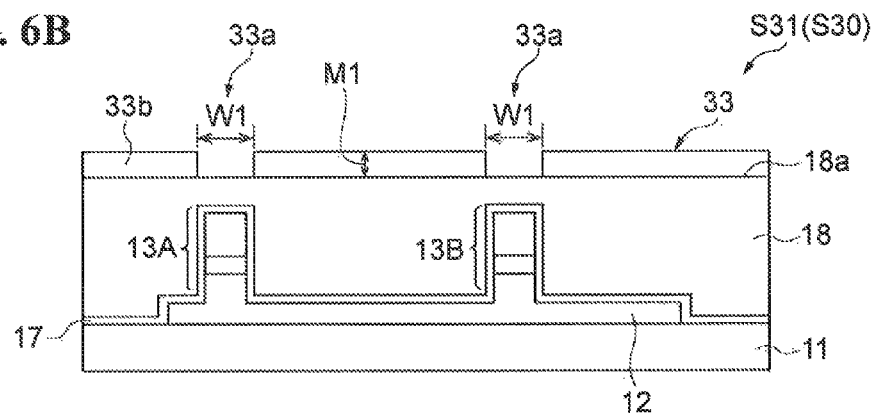

In step S31, as shown in FIG. 6B, a resist mask 33 is formed on the surface 18a of the buried layer 18. First, a resist is applied, by a spin coating method or the like, onto the entire surface 18a of the buried layer 18. Next, an opening pattern 33a is formed by patterning the resist by photolithography.

The resist mask 33 is, for example, composed of a material which does not contain silicon or a material having a lower silicon content (in terms of weight ratio) than the BCB resin constituting the buried layer 18 and having a thickness M1 of 2.0 µm to 5.0 µm. The resist mask 33 has two opening patterns 33a and a mask portion 33b covering the surface 18a of the buried layer 18. The two opening patterns 33a each has an opening width W1 of 0.5 µm to 7.0 µm. The surface 18a of the buried layer 18 located on the mesa structures 13A and 13B is exposed from the opening patterns 33a. The mask portion 33b is composed of a material which does not contain silicon or a material having a lower silicon content (in terms of weight ratio) than the BCB constituting the buried layer 18.

Figure 6C:
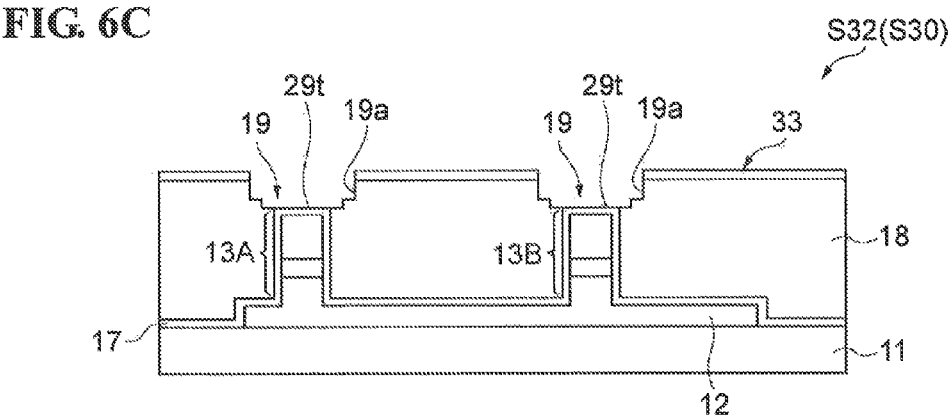

In step S32, as shown in FIG. 6C, first openings 19 are formed. First, etching is performed on the buried layer 18 located on the mesa structures 13A and 13B using the resist mask 33. Recesses are formed by the etching. In the etching process, the buried layer 18 is etched to a depth that does not expose the protective layer 17t on the upper surface 13t of each of the mesa structures 13A and 13B (see FIG. 9A). In the etching, an RIE method using a gas mixture of $CF_4$ and $O_2$ as an etching gas can be used.

In this embodiment, the buried layer 18 and the resist mask 33 are composed of materials that have different silicon contents. In the etching of the buried layer 18 using such a resist mask 33, three cases will be described: a case where $CF_4$ is used as the etching gas, a case where $O_2$ is used as the etching gas, and a case where a gas mixture of $CF_4$ and $O_2$ is used as the etching gas.

In the case of etching using $CF_4$ as the etching gas, the etching rate is influenced by the silicon content in the material to be etched. The BCB resin constituting the buried layer 18 contains a larger amount of silicon than the material constituting the resist mask 33. On the other hand, the material constituting the resist mask 33 is a material which does not contain silicon or a material having a lower silicon content than the BCB resin constituting the buried layer 18. Consequently, the etching rate of the buried layer 18 becomes higher than the etching rate of the resist mask 33. In this case, the buried layer 18 is selectively etched.

In the case of etching using $O_2$ as the etching gas, the etching rate of the resist mask 33 which does not contain silicon or which has a low silicon content becomes high. In this case, the resist mask 33 is selectively etched.

In the case of etching using a gas mixture of $CF_4$ and $O_2$ as the etching gas, first, in the buried layer 18, silicon contained in the BCB resin is oxidized by $O_2$ to silicon oxide. When the resist mask 33 is composed of a material containing silicon, in the resist mask 33, silicon contained in the resist is also oxidized to silicon oxide. Since silicon oxide is etched by $CF_4$, the etching rate is increased.

In this step, the mixing ratio of $CF_4$ to $O_2$, in terms of the partial pressure ratio ($CF_4:O_2$), is preferably in a range of 4:5 to 1:1. For example, when the mixing ratio is 4:5 or the $CF_4$ ratio is higher than this, the etching rate of the BCB resin constituting the buried layer 18 can be increased. Furthermore, for example, when the mixing ratio is 1:1 or the $O_2$ ratio is higher than this, the etching rate of the resist mask 33 can be increased. Therefore, etching rates of the BCB resin constituting the buried layer 18 and the resist mask 33 are controlled by changing the mixing ratio of $CF_4$ to $O_2$ in the RIE process.

After the recesses are formed, by adjusting the mixing ratio of $CF_4$ to $O_2$, the resist mask 33 is partially etched. Etching is performed by adjusting the mixing ratio of $CF_4$ to $O_2$ such that the BCB resin constituting the buried layer 18 is hardly etched or the etching rate of the buried layer 18 is lower than the etching rate of the resist mask 33. The opening width of the opening patterns 33a formed in the resist mask 33 is increased by the etching.

In the etching for increasing the opening width of the opening patterns 33a, preferably, the mixing ratio of $CF_4$ to $O_2$, in terms of the partial pressure ratio ($CF_4:O_2$), is in a range of 1:3 to 1:5. For example, when the mixing ratio is 1:5 or the $CF_4$ ratio is higher than this, silicon in the BCB resin reacts with $O_2$ to produce silicon oxide. The silicon oxide can be sufficiently removed by $CF_4$. When the mixing ratio is 1:3 or the $O_2$ ratio is higher than this, the resist mask 33 can be sufficiently etched by $O_2$.

After the opening width of the opening pattern 33a is increased, etching is performed again on the buried layer 18. The protective layer 17 located on each of the mesa structures 13A and 13B is exposed by the etching (refer to FIG. 6C). In the etching process, the etching rate of the protective layer 17 composed of silicon oxide or the like is ½ or less of the etching rate of the buried layer 18. Therefore, the protective layer 17 is hardly etched. First openings 19 extending from the surface 18a of the buried layer 18 to the protective layer 17 are formed in the buried layer 18 by the steps described above.

The inclination angle of the side surface 19a surrounding the first opening 19 is preferably 50 degrees or less with respect to the depth direction of the first opening 19.

Figure 7A:
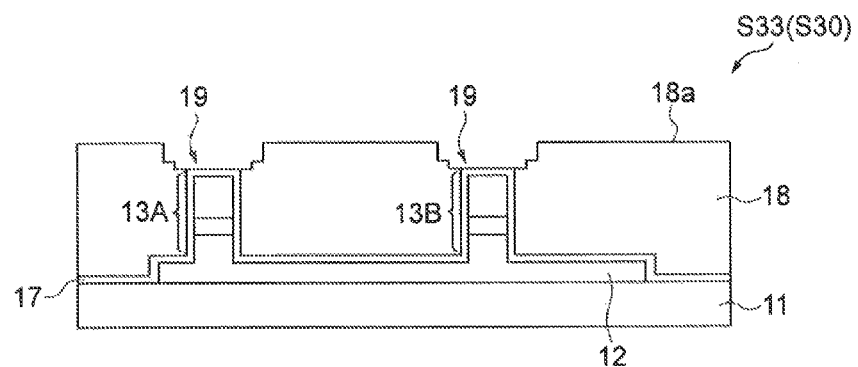
FIGS. 7A to 7C are views for illustrating the method for manufacturing an optical semiconductor device according to the first embodiment.

In step S33, as shown in FIG. 7A, the resist mask 33 is removed. The surface 18a of the buried layer 18 is exposed by step S33. In order to remove the resist mask 33, for example, an organic solvent can be used.

Note that, in this embodiment, the third step S30 includes the steps S31 to S33 described above (refer to FIG. 3).

A fourth step S50 for forming a second opening 21 is carried out. The fourth step S50 includes a first etching step including steps S51 to S53 for forming a recess 35 and a second etching step including steps S54 to S56 for forming the second opening 21. That is, in this embodiment, the second opening 21 is provided in the buried layer 18 by performing etching twice.

Figure 7B:
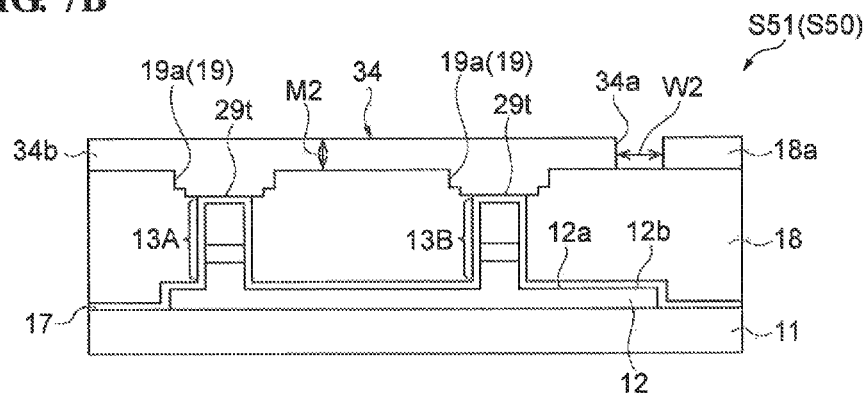

In step S51, as shown in FIG. 7B, a first resist mask 34 for forming the recess 35 (refer to FIG. 7C) in the buried layer 18 is formed. In step S51, a resist is applied, by a spin coating method or the like, onto the entire surface 18a of the buried layer 18. Then, a predetermined opening pattern is formed by patterning the resist by photolithography. The first resist mask 34 may be composed of the same material as that for the resist mask 33 formed in step S31.

The first resist mask 34 is, for example, composed of a material which does not contain silicon or a material having a lower silicon content (in terms of weight ratio) than the BCB resin constituting the buried layer 18 and having a thickness M2 of 2.0 µm to 5.0 µm. The first resist mask 34 has an opening pattern 34a and a mask portion 34b which covers the buried layer 18. The opening pattern 34a has an opening width W2 of 1.0 µm to 200 µm. The buried layer 18 located on the portion 12b of the semiconductor layer 12 is exposed from the opening pattern 34a.

Figure 7C:
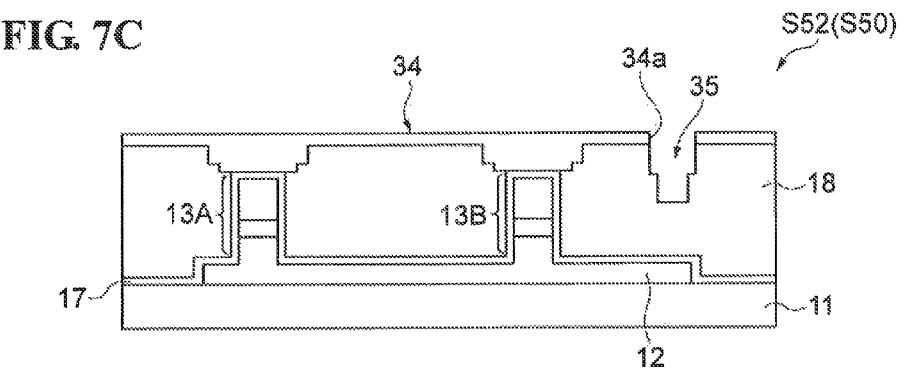

In step S52, as shown in FIG. 7C, etching is performed on the buried layer 18 using the first resist mask 34. The recess 35 is formed by the etching. In the etching, an RIE method can be used.

Step S52 will be described in details. In step S52, as in step S32, after the buried layer 18 is etched to a certain depth, the opening width of the opening pattern of the resist mask is increased, and the buried layer is further etched.

Figure 10A:
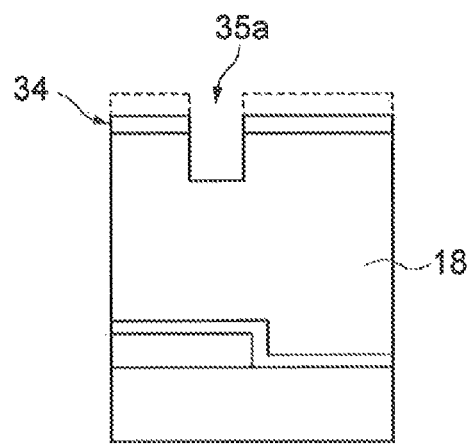
FIGS. 10A to 10C are views for illustrating a step of forming a second opening.

First, a first etching step is carried out. In the first etching step, as shown in FIG. 10A, using the first resist mask 34, etching is performed on the buried layer 18 to form a recess 35a. In the etching, an RIE method using $CF_4$ and $O_2$ as etching gases can be used. In this step, the mixing ratio (first mixing ratio) of $CF_4$ to $O_2$, in terms of the partial pressure ratio ($CF_4:O_2$), is set in a range of 4:5 to 1:1.

Figure 10B:
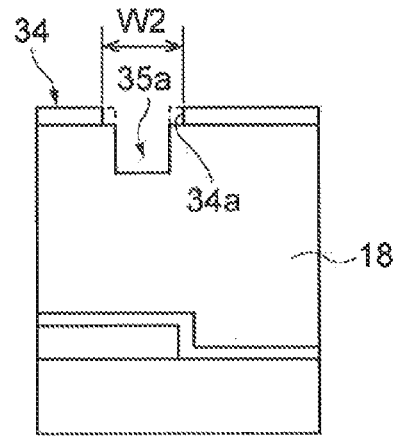

As shown in FIG. 10B, after the recess 35a is formed, the mixing ratio (second mixing ratio) of $CF_4$ to $O_2$, in terms of the partial pressure ratio ($CF_4:O_2$), is changed, for example, to a range of 1:3 to 1:5, and the first resist mask 34 is partially etched. When an etching gas having such a mixing ratio is used, the BCB resin constituting the buried layer 18 is hardly etched. Alternatively, the etching rate of the buried layer 18 can be set to be lower than the etching rate of the first resist mask 34. Consequently, the opening width W2 of the opening pattern 34a formed in the first resist mask 34 is increased by the etching.

Figure 10C:
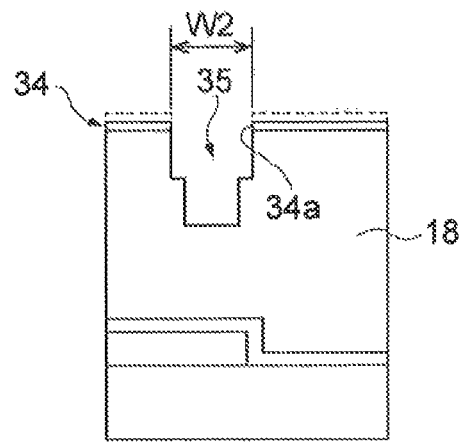

As shown in FIG. 10C, after the opening width W2 of the opening pattern 34a is increased, the mixing ratio (third mixing ratio) of $CF_4$ to $O_2$, in terms of the partial pressure ratio ($CF_4:O_2$), is changed, for example, to a range of 4:5 to 1:1, and etching is performed again on the buried layer 18. The recess 35 is formed in the buried layer 18 by the steps described above.

Note that, in step S52, etching may be performed on the buried layer 18 without increasing the opening width of the opening pattern 34a of the first resist mask 34.

Figure 8A:
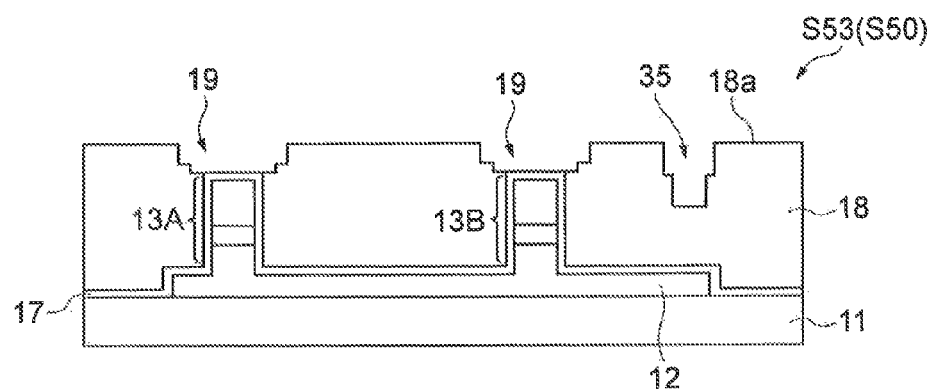
FIGS. 8A to 8C are views for illustrating the method for manufacturing an optical semiconductor device according to the first embodiment.

In step S53, as shown in FIG. 8A, the first resist mask 34 whose thickness has been decreased by the etching in step S52 is removed. The surface 18a of the buried layer 18 is exposed again by step S53. In order to remove the first resist mask 34, for example, an organic solvent can be used.

Figure 8B:
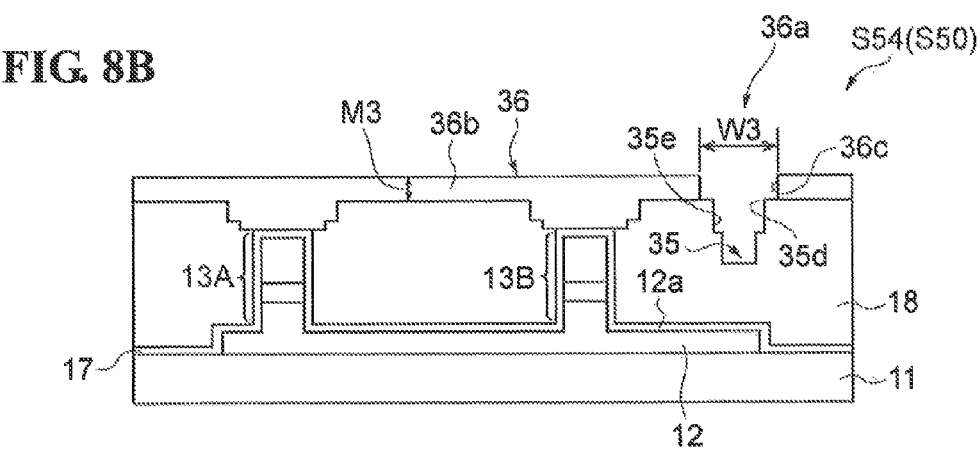

In step S54, as shown in FIG. 8B, a second resist mask 36 is formed on the surface 18a of the buried layer 18.

The second resist mask 36 is composed of, for example, a material which does not contain silicon or a material having a lower silicon content (in terms of weight ratio) than the BCB resin constituting the buried layer 18 and having a thickness M3 of 2.0 µm to 5.0 µm. The second resist mask 36 has an opening pattern 36a and a mask portion 36b which covers the buried layer 18. The opening pattern 36a has an opening width W3 of 3.0 µm to 220 µm, which is not smaller than the opening width W2 of the recess 35. For example, the opening width W3 of the second resist mask 36 is set to be larger, in the range of 2 µm to 20 µm, than the opening width W2 of the first resist mask 34 (refer to FIG. 10C). More preferably, the opening width W3 of the second resist mask 36 is set to be larger, in the range of 2 μm to 5 μm, than the opening width W2 of the first resist mask 34. The recess 35 and the surface 18a of the buried layer 18 surrounding the recess 35 are exposed from the opening pattern 36a. The opening width W3 of the second resist mask 36 is larger than the opening width W2 of the recess 35. That is, the wall 36c of the second resist mask 36 recedes from the edge 35d of the recess 35.

The second resist mask 36 having such an opening pattern 36a can be obtained by exposing the resist for forming the second resist mask 36 by using the same photomask as the photomask used for forming the first resist mask 34 and setting the exposure amount larger than the exposure amount at the time of formation of the first resist mask 34. In this case, the first resist mask 34 and the second resist mask 36 are preferably made of a positive type resist material. Alternatively, the second resist mask 36 can be obtained by exposing the resist using another photomask having a larger opening width than the opening width of the photomask used for forming the first resist mask 34.

Figure 8C:
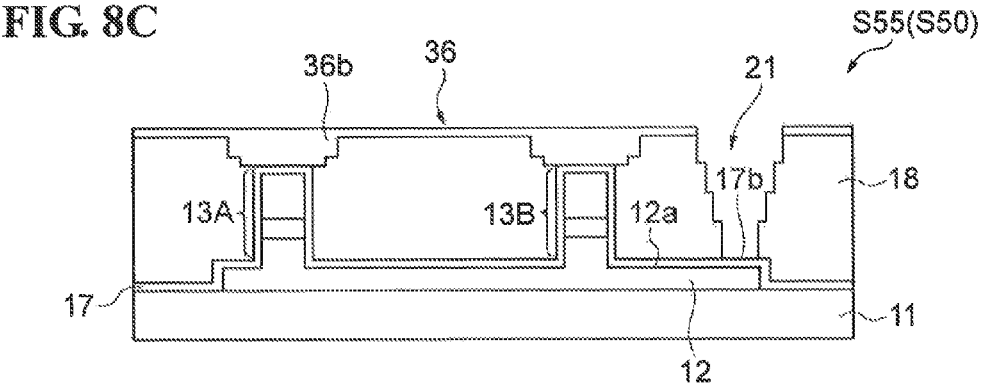

In step S55, as shown in FIG. 8C, etching is performed on the buried layer 18 using the second resist mask 36. In the etching, an RIE method can be used. A second opening 21 through which the protective layer 17b on the principal surface 12a of the semiconductor layer 12 is exposed is formed by the etching.

Figure 11A:
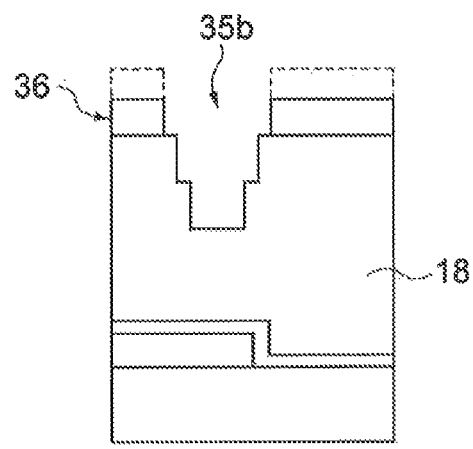
FIGS. 11A to 11C are views for illustrating a step of forming a second opening.

Step S55, which is the second etching step, will be described in detail below. As shown in FIG. 11A, using the second resist mask 36, etching is performed on the buried layer 18 to form a recess 35b. In the etching, an RIE method using a gas mixture of $CF_4$ and $O_2$ as an etching gas can be used. In this step, the mixing ratio (fourth mixing ratio) of $CF_4$ to $O_2$, in terms of the partial pressure ratio ($CF_4:O_2$), is set in a range of 4:5 to 1:1.

Figure 11B:
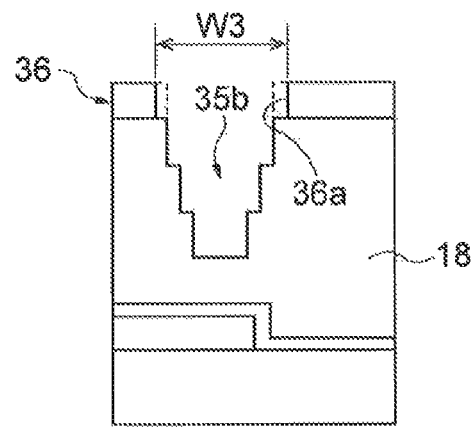

As shown in FIG. 11B, after the recess 35b is formed, the mixing ratio (fifth mixing ratio) of $CF_4$ to $O_2$, in terms of the partial pressure ratio ($CF_4:O_2$), is changed, for example, to a range of 1:3 to 1:5, and the second resist mask 36 is partially etched. That is, by decreasing $CF_4$ or increasing $O_2$ from the mixing ratio at the time of etching the buried layer 18, the mixing ratio described above is set. The opening width W3 of the opening pattern 36a formed in the second resist mask 36 is increased by the etching.

Figure 11C:
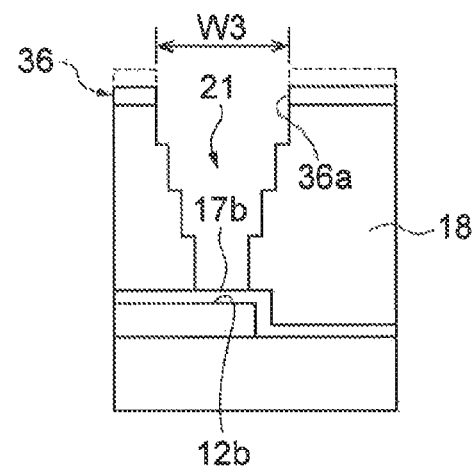

As shown in FIG. 11C, after the opening width W3 of the opening pattern 36a is increased, the mixing ratio of $CF_4$ to $O_2$ (sixth mixing ratio), in terms of the partial pressure ratio ($CF_4:O_2$), is changed, for example, to a range of 4:5 to 1:1, and etching is performed again on the buried layer 18. That is, by increasing $CF_4$ or decreasing $O_2$ from the mixing ratio at the time of increasing the opening width W3 of the opening pattern 36a of the resist mask 36, the mixing ratio described above is set. The second opening 21 through which the protective layer 17 on the portion 12b of the semiconductor layer 12 is exposed is formed by the etching. In this etching, the etching rate of the protective layer 17 composed of silicon oxide or the like is sufficiently small compared with the etching rate of the buried layer 18, and therefore, the protective layer 17 is hardly etched. The second opening 21 is formed in the buried layer 18 by the steps described above.

Figure 9A:
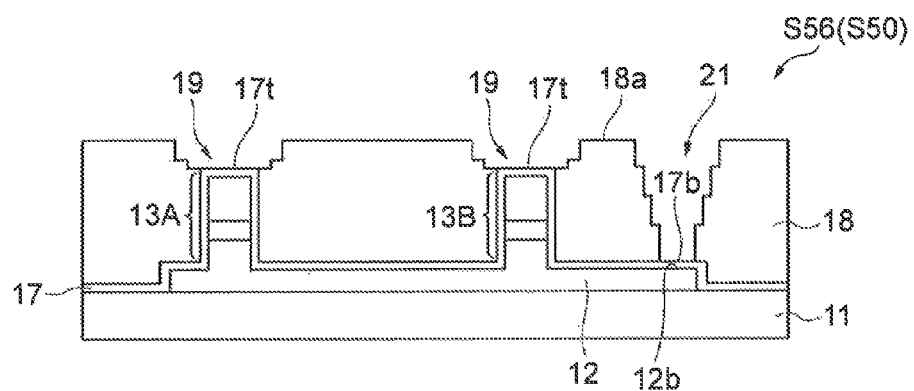
FIGS. 9A to 9C are views for illustrating the method for manufacturing an optical semiconductor device according to the first embodiment.

In step S56, as shown in FIG. 9A, the second resist mask 36 whose thickness has been decreased by the etching in step S55 is removed. The surface 18a of the buried layer 18 is exposed again by step S56. In order to remove the second resist mask 36, for example, an organic solvent can be used.

Note that it is not appropriate to use ashing with $O_2$ to remove the second resist mask 36 in step S56. This is because silicon contained in the buried layer 18 exposed from the second resist mask 36 is oxidized by ashing with $O_2$.

In this embodiment, the fourth step S50 includes the steps S51 to S56 described above (refer to FIG. 3).

Figure 9B:
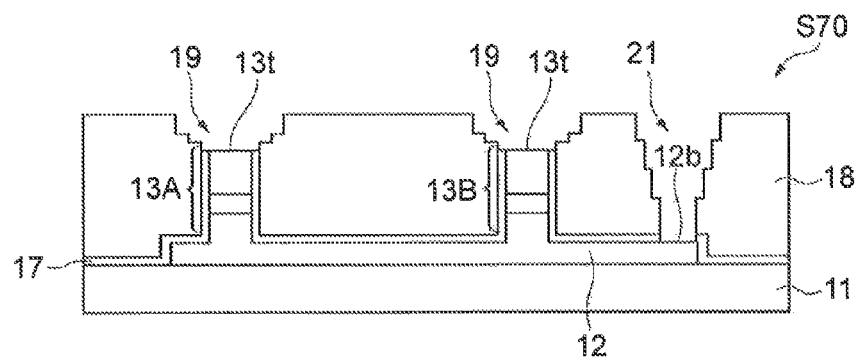

In step S70, as shown in FIG. 9B, the protective layer 17t exposed from the first openings 19 and the protective layer 17b exposed from the second opening 21 are etched away. The upper surface 13t of each of the mesa structures 13A and 13B and the portion 12b of the semiconductor layer 12 are exposed by the etching. In the etching, for example, a RIE method using an etching gas containing $CF_4$ can be used.

Figure 9C:
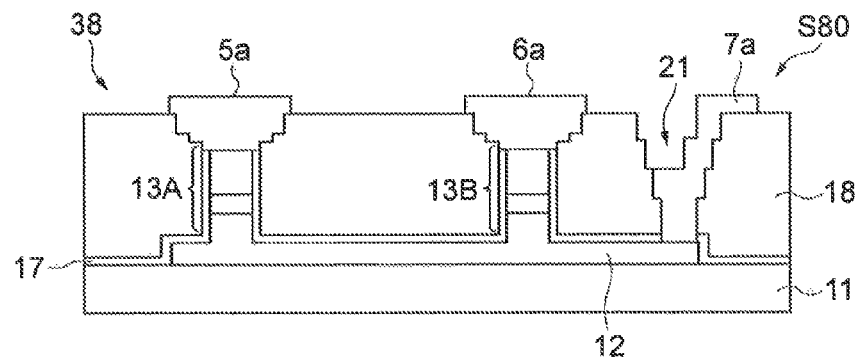

In step S80, as shown in FIG. 9C, first electrodes 5a and 6a and a second electrode 7a are formed. In order to form the first electrodes 5a and 6a and the second electrode 7a, for example, a vacuum evaporation method can be used.

The back surface 11b of the semiconductor substrate 11 of a substrate product 38 obtained by the steps described above is polished to decrease the thickness of the semiconductor substrate 11 to a predetermined value (about 100 μm). Thereby, a Mach-Zehnder modulator 1, which is an optical semiconductor device, is obtained (refer to FIG. 2).

Advantages of this embodiment will be described. As described above, when etching is performed on the buried layer 18 composed of the BCB resin, the thickness of the resist mask is decreased. When a buried layer is etched using a resist mask, the range of settable selectivity and the thickness of the resist mask are limited.

In the fourth step S50 of the manufacturing method according to this embodiment, after the first resist mask 34 whose thickness has been decreased by the etching for forming the recess 35 (step S52) is removed, the second resist mask 36 is formed and the buried layer 18 is etched again (step S54). Therefore, even when the buried layer 18 is etched using the first resist mask 34 and the second resist mask 36, it is possible to form the second opening 21 which is deeper than the first opening 19. Consequently, the first electrodes 5a and 6a and the second electrode 7a can be formed in the first openings 19 and the second opening 21 which have depths different from each other. In other words, the first electrodes 5a and 6a and the second electrode 7a can be formed through portions of the buried layer 18 having different thicknesses T1 and T2.

By performing heat treatment on the resist constituting the second resist mask 36, the shape of the opening edge of the second resist mask 36 can be changed. Specifically, the shape of the side surface of the opening of the second resist mask 36 can be made inclined with respect to the depth direction by the heat treatment. However, the second resist mask 36 is formed up to the side surface of the recess 35. In this case, even if the resist constituting the second resist mask 36 is subjected to heat treatment, the second resist mask 36 on the side surface may not have a shape inclined with respect to the depth direction. Consequently, perpendicularity of the side surface of the recess 35 is maintained. This may result in connection failure (i.e., disconnection caused by steps) of the second electrode 7a.

In contrast, in the manufacturing method according to this embodiment, the second resist mask 36 has the opening width W3 that is larger than the opening width W2 of the recess 35. Therefore, the side surface 21a of the second opening 21 is inclined with respect to the depth direction of the second opening 21. Consequently, it is possible to suppress the occurrence of connection failure (i.e., disconnection caused by steps) of the second electrode 7a.

In the manufacturing method according to this embodiment, etching is performed on the buried layer 18 using a gas mixture of $CF_4$ and $O_2$. By adjusting the gas mixture of $CF_4$ and $O_2$, it is possible to control the etching rate of the buried layer 18 and the etching rate of the resist mask 33.

In the manufacturing method according to this embodiment, the side surface 19a of the first opening 19 is inclined at an angle of 80 degrees or less with respect to the depth direction of the first opening 19. Since the first opening 19 is reliably covered with the second resist mask 36, it is possible to suppress degradation of the shape of the first opening 19 due to etching for forming the second opening 21.

Second Embodiment

A method for manufacturing an optical semiconductor device according to a second embodiment will be described. In this embodiment, as in the first embodiment, a method for manufacturing a Mach-Zehnder modulator 1 will be described as the optical semiconductor device.

Figure 12:
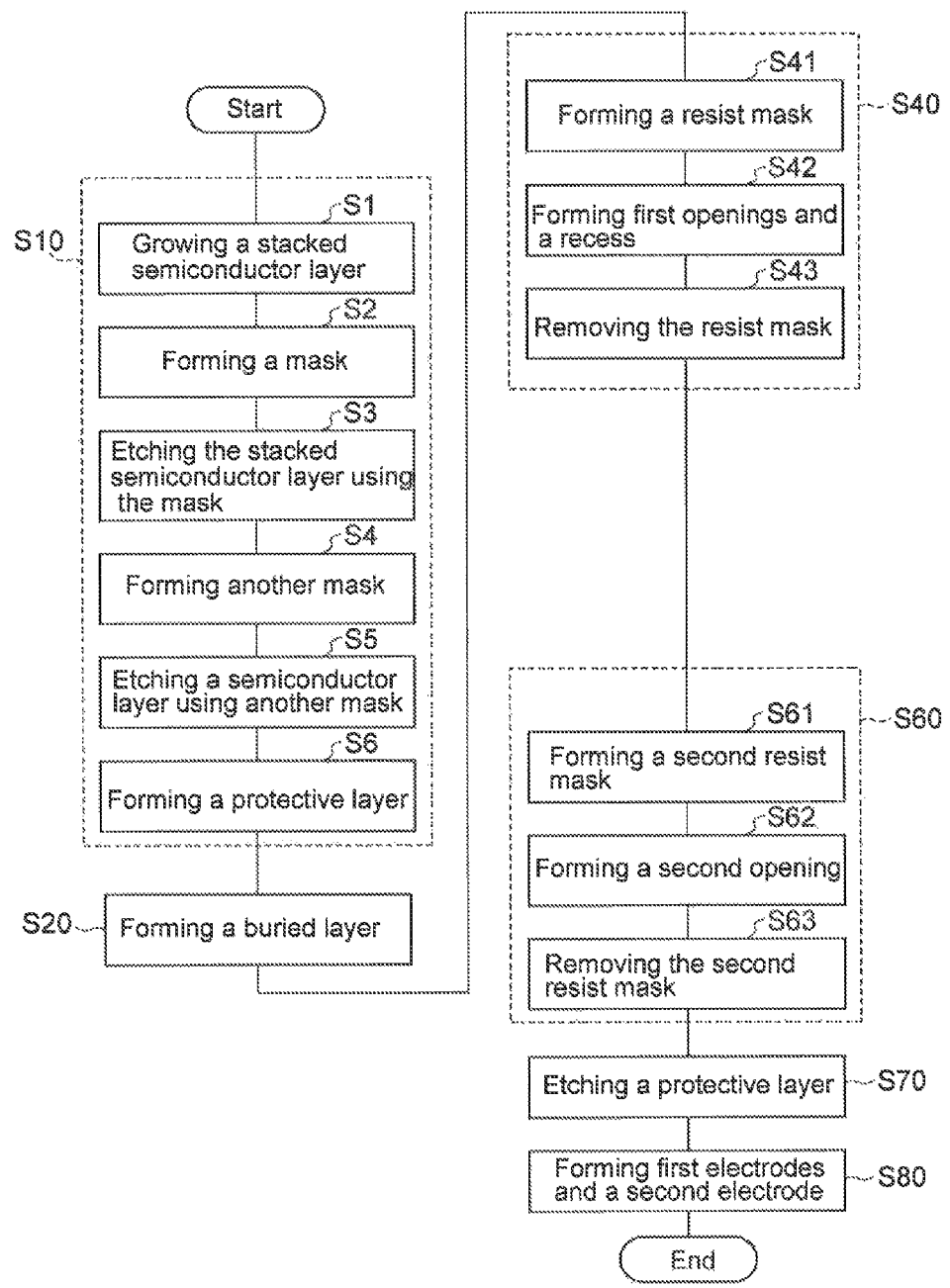
FIG. 12 is a diagram showing major steps in a method for manufacturing an optical semiconductor device according to a second embodiment.

FIG. 12 is a diagram showing major steps in a method for manufacturing an optical semiconductor device according to the second embodiment. The manufacturing method according to the second embodiment differs from the manufacturing method according to the first embodiment in that, in the third step S40, a first opening 19 and a recess 41 (refer to FIG. 13B) are formed, and in the fourth step S60, additional etching is performed on the recess 41 at least once. That is, the first step S10 of preparing the substrate product 31, step S20 of forming the buried layer 18, step S70 of performing etching on the protective layer, and step S80 of forming the first electrodes 5a and 6a and the second electrode 7a are the same as those in the manufacturing method according to the first embodiment. The third step S40 and the fourth step 60 will be described in detail below.

Figure 13A:
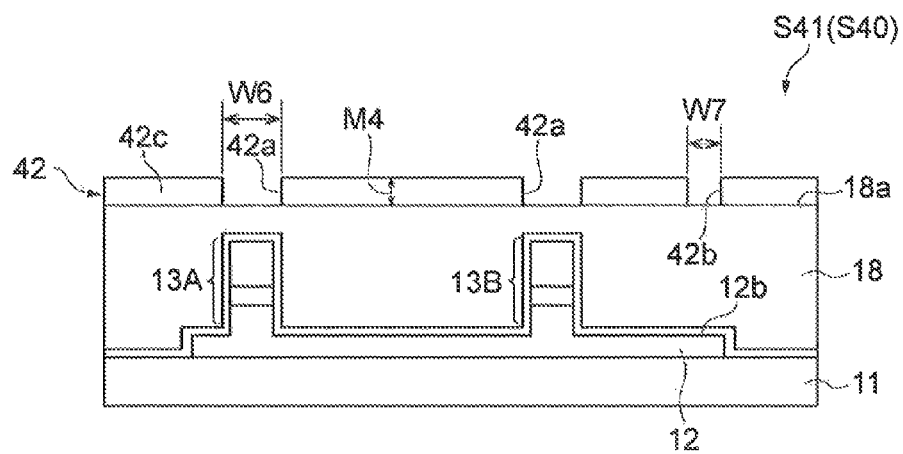
FIGS. 13A to 13C are views for illustrating the method for manufacturing an optical semiconductor device according to the second embodiment.

In step S41, as shown in FIG. 13A, a resist mask 42 is formed on the surface 18a of the buried layer 18. First, a resist is applied, by a spin coating method or the like, onto the entire surface 18a of the buried layer 18. Next, opening patterns 42a and 42b are formed by patterning the resist by photolithography.

The resist mask 42 is, for example, composed of a material which does not contain silicon or a material having a lower silicon content (in terms of weight ratio) than the BCB resin constituting the buried layer 18 and having a thickness M4 of 2.0 μm to 5.0 μm. The resist mask 42 has two opening patterns 42a for first openings 19, an opening pattern 42b for a recess 41, and a mask portion 42c which covers the surface 18a of the buried layer 18. The opening patterns 42a each have an opening width W6 of 0.5 μm to 7.0 μm. The surface 18a of the buried layer 18 on each of the mesa structures 13A and 13B is exposed from the opening pattern 42a. The opening pattern 42b has an opening width W7 of 1.0 μm to 200 μm. The buried layer 18 on the portion 12b of the semiconductor layer 12 is exposed from the opening pattern 42b.

Figure 13B:
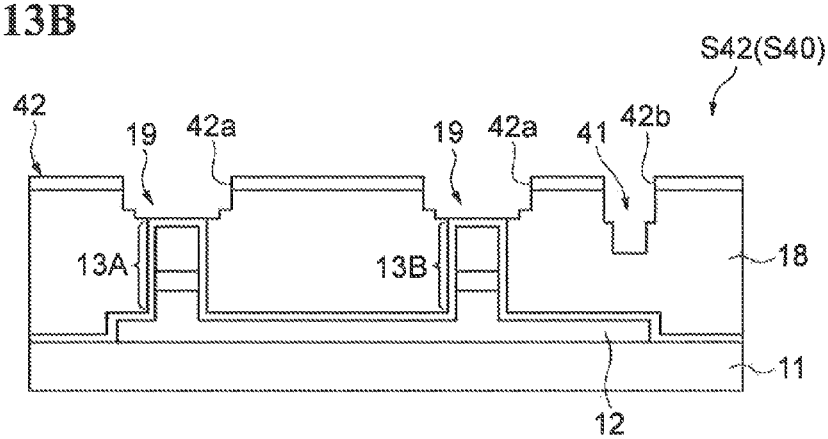

In step S42, as shown in FIG. 13B, using the resist mask 42, etching is performed on the buried layer 18. First openings 19 and a recess 41 are formed by the etching. In the etching, an RIE method can be used. In the etching process, as in step S32 of the first embodiment, after the buried layer 18 is etched to a certain depth, the opening width of each of the opening patterns 42a and 42b of the resist mask 42 is increased. In addition, the buried layer 18 is further etched.

Figure 13C:
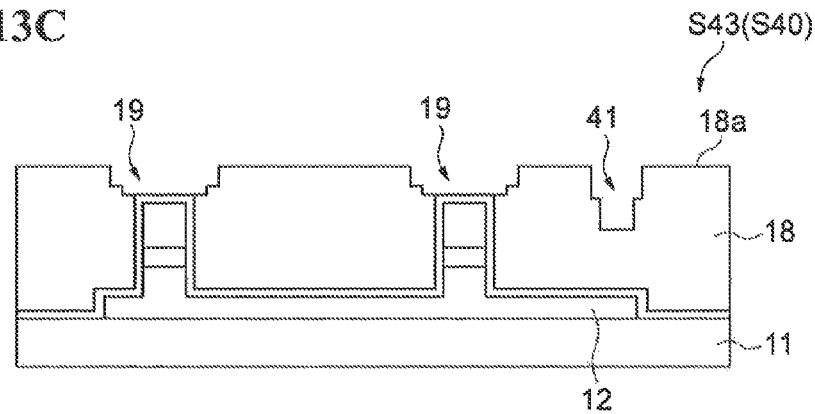

In step S43, as shown in FIG. 13C, the resist mask 42 is removed. In order to remove the resist mask 42, for example, an organic solvent can be used.

Note that, in this embodiment, the third step S40 includes the steps S41 to S43 described above (refer to FIG. 12).

Figure 14A:
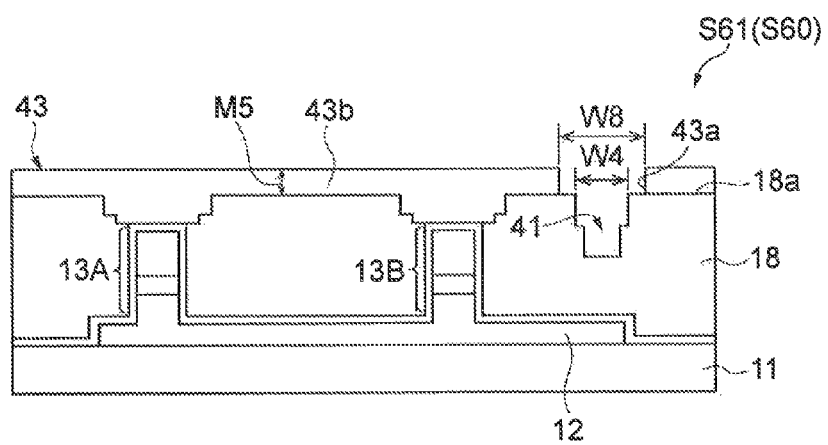
FIGS. 14A to 14C are views for illustrating the method for manufacturing an optical semiconductor device according to the second embodiment.

In step S61, as shown in FIG. 14A, a second resist mask 43 is formed on the surface 18a of the buried layer 18.

The second resist mask 43 is, for example, composed of a material which does not contain silicon or a material having a lower silicon content (in terms of weight ratio) than the BCB resin constituting the buried layer 18 and having a thickness M5 of 2.0 μm to 5.0 μm. The resist mask 43 has an opening pattern 43a and a mask portion 43b covering the buried layer 18. The opening pattern 43a has an opening width W8 of 3.0 μm to 220 μm. the recess 41 and the surface 18a of the buried layer 18 surrounding the recess 41 are exposed from the opening pattern 43a.

Figure 14B:
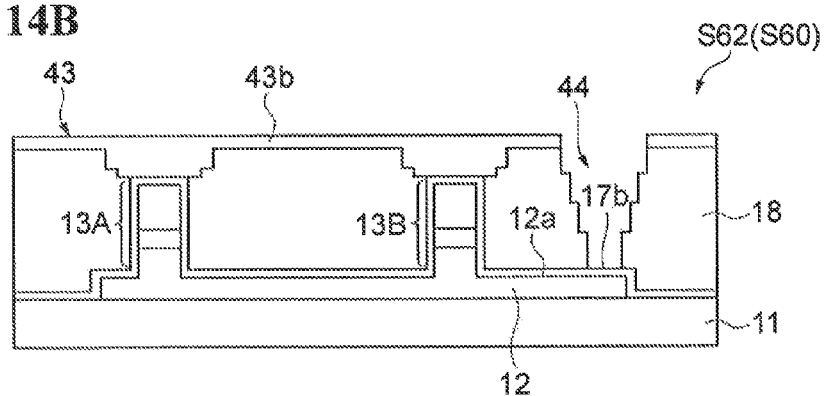

In step S62, as shown in FIG. 14B, using the second resist mask 43, etching is performed on the buried layer 18. In the etching, an RIE method can be used. A second opening 44 is formed by the etching. Then, the protective layer 17b on the principal surface 12a of the semiconductor layer 12 is exposed through the second opening 44.

Figure 14C:
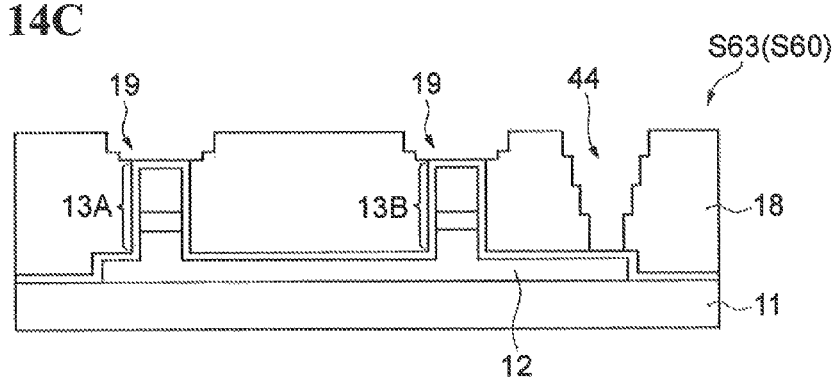

In step S63, as shown in FIG. 14C, the second resist mask 43 is removed. In order to remove the second resist mask 43, for example, an organic solvent can be used.

Note that, in this embodiment, the fourth step S60 includes the steps S61 to S63 described above (refer to FIG. 12).

In the method for manufacturing an optical semiconductor device according to the second embodiment, the first openings 19 and the recess 41 are simultaneously formed. Consequently, it is possible to decrease one etching step from the method for manufacturing an optical semiconductor device according to the first embodiment.

The preferred embodiments of the present invention have been described. However, it is to be understood that the present invention is not limited to the embodiments described above.

For example, in each of the first and second embodiments, the second etching step to be carried out after the formation of the recess 35 or 41 is carried out once. However, the second etching step may be carried out a plurality of times.

For example, in each of the first and second embodiments, a Mach-Zehnder modulator is taken as an example of an optical semiconductor device. However, the optical semiconductor device manufactured by the manufacturing method according to the present invention may be a semiconductor laser device or the like including a ridge-shaped or high-mesa-shaped semiconductor layer.

Principles of the present invention have been described on the basis of preferred embodiments with reference to the drawings. However, those skilled in the art will understand that the embodiments can be changed in terms of details without departing from the principles. Therefore, all the modifications and changes within the scope and the spirit of Claims are claimed as the present invention.

What is claimed is:

1. A method for manufacturing an optical semiconductor device comprising the steps of:
   preparing a substrate product including a semiconductor layer, a mesa structure disposed on a principal surface of the semiconductor layer, and a protective layer, the protective layer being formed on the principal surface of the semiconductor layer, a side surface of the mesa structure, and an upper surface of the mesa structure;
   forming a buried layer composed of a resin on the substrate product;
   forming a first opening in the buried layer on the mesa structure by etching the buried layer;
   forming a second opening in the buried layer on the semiconductor layer by etching the buried layer;
   exposing the upper surface of the mesa structure and the principal surface of the semiconductor layer by etching the protective layer;

forming a first electrode in the first opening, the first electrode extending from the surface of the buried layer to the upper surface of the mesa structure; and forming a second electrode in the second opening, the second electrode extending from the surface of the buried layer to the principal surface of the semiconductor layer, wherein the step of forming the second opening includes a first etching step and a second etching step, the first etching step includes steps of forming a first resist mask having an opening pattern for forming a recess in the buried layer on the semiconductor layer, etching the buried layer using the first resist mask, and removing the first resist mask, and the second etching step includes steps of, after the first etching step, forming a second resist mask having an opening pattern which has an opening width not smaller than an opening width of the recess, the recess being exposed through the opening pattern of the second resist mask, etching the buried layer using the second resist mask, and removing the second resist mask.

2. The method for manufacturing an optical semiconductor device according to claim 1, wherein the opening width of the opening pattern of the second resist mask is set to be larger, in the range of 2 µm to 20 µm, than an opening width of the opening pattern of the first resist mask.

3. The method for manufacturing an optical semiconductor device according to claim 1, wherein the second resist mask is formed using the same photomask as that for forming the first resist mask, and the exposure amount at the time of forming the second resist mask is larger than the exposure amount at the time of forming the first resist mask.

4. The method for manufacturing an optical semiconductor device according to claim 1, wherein the buried layer is composed of a benzocyclobutene resin, and the first resist mask is composed of a material which does not contain silicon or a material having a lower silicon content than the benzocyclobutene, and wherein, in the first etching step, the step of etching the buried layer further includes steps of:

forming the recess by selectively etching the buried layer, using the first resist mask, by a reactive ion etching method using an etching gas containing $CF_4$ and $O_2$ at a first mixing ratio, increasing the opening width of the opening pattern of the first resist mask by selectively etching a portion of the first resist mask with the mixing ratio of the etching gas containing $CF_4$ and $O_2$ being changed to a second mixing ratio that is different from the first mixing ratio, and selectively etching the buried layer, after increasing the opening width of the opening pattern of the first resist mask, with the mixing ratio of the etching gas containing $CF_4$ and $O_2$ being changed to a third mixing ratio that is different from the second mixing ratio.

5. The method for manufacturing an optical semiconductor device according to claim 4, wherein the first mixing ratio and the third mixing ratio of $CF_4$ to $O_2$ are set in a range of 4:5 to 1:1, and the second mixing ratio of $CF_4$ to $O_2$ is set in a range of 1:3 to 1:5, in terms of the partial pressure ratio.

6. The method for manufacturing an optical semiconductor device according to claim 1, wherein the buried layer is composed of a benzocyclobutene resin, and the second resist mask is composed of a material which does not contain silicon or a material having a lower silicon content than the benzocyclobutene, and wherein, in the second etching step, the step of etching the buried layer further includes the steps of:

selectively etching the buried layer, using the second resist mask, by a reactive ion etching method using an etching gas containing $CF_4$ and $O_2$ at a fourth mixing ratio, increasing the opening width of the opening pattern of the second resist mask by selectively etching a portion of the second resist mask with the mixing ratio of the etching gas containing $CF_4$ and $O_2$ being changed to a fifth mixing ratio that is different from the fourth mixing ratio, and selectively etching the buried layer, after the opening width of the opening pattern of the second resist mask has been increased, with the mixing ratio of the etching gas containing $CF_4$ and $O_2$ being changed to a sixth mixing ratio that is different from the fifth mixing ratio.

7. The method for manufacturing an optical semiconductor device according to claim 6, wherein the fourth mixing ratio and the sixth mixing ratio of $CF_4$ to $O_2$ are set in a range of 4:5 to 1:1, and the fifth mixing ratio of $CF_4$ to $O_2$ is set in a range of 1:3 to 1:5, in terms of the partial pressure ratio.

8. The method for manufacturing an optical semiconductor device according to claim 1, wherein the second opening has a depth measured from the surface of the buried layer to the principal surface of the semiconductor layer larger than a depth measured from the surface of the buried layer to the upper surface of the mesa structure of the first opening.

9. The method for manufacturing an optical semiconductor device according to claim 1, wherein the optical semiconductor device includes a Mach-Zehnder modulator having a first waveguide and a second waveguide, the first waveguide and the second waveguide including the mesa structure, wherein the step of preparing the substrate product includes steps of growing a stacked semiconductor layer including a first cladding layer, a core layer, and a second cladding layer, and forming the first waveguide and the second waveguide of the Mach-Zehnder modulator by etching the stacked semiconductor layer, and wherein the protective layer is composed of silicon oxide.

10. The method for manufacturing an optical semiconductor device according to claim 9, wherein the semiconductor layer and the first cladding are each composed of n-type InP; the core layer is composed of AlGaInAs; and the second cladding layer is composed of p-type InP.

11. A method for manufacturing an optical semiconductor device comprising the steps of:

preparing a substrate product including a semiconductor layer, a mesa structure disposed on a principal surface of the semiconductor layer, and a protective layer, the protective layer being formed on the principal surface of the semiconductor layer, a side surface of the mesa structure, and an upper surface of the mesa structure;

forming a buried layer composed of a resin on the substrate product;

forming a first resist mask having opening patterns for forming a first opening in the buried layer on the mesa structure and a recess in the buried layer on the semiconductor layer;

forming the first opening and the recess by etching the buried layer using the first resist mask;

forming a second opening in the buried layer on the semiconductor layer by etching the buried layer, exposing the upper surface of the mesa structure and the principal surface of the semiconductor layer by etching the protective layer;

forming a first electrode in the first opening, the first electrode extending from the surface of the buried layer to the upper surface of the mesa structure; and forming a second electrode in the second opening, the second electrode extending from the surface of the buried layer to the principal surface of the semiconductor layer, wherein the step of forming the second opening includes steps of forming a second resist mask having an opening pattern which has an opening width not smaller than an opening width of the recess, the recess being exposed through the opening pattern of the second resist mask, etching the buried layer using the second resist mask, and removing the second resist mask.

12. The method for manufacturing an optical semiconductor device according to claim 11, wherein the buried layer is composed of a benzocyclobutene resin, and the second resist mask is composed of a material which does not contain silicon or a material having a lower silicon content than the benzocyclobutene; and wherein, in the step of forming the second opening, the step of etching the buried layer further includes the steps of:

selectively etching the buried layer, using the second resist mask, by a reactive ion etching method using an etching gas containing $CF_4$ and $O_2$ at a first mixing ratio, increasing the opening width of the opening pattern of the second resist mask by selectively etching a portion of the second resist mask with the mixing ratio of the etching gas containing $CF_4$ and $O_2$ being changed to a second mixing ratio that is different from the first mixing ratio, and selectively etching the buried layer, after the opening width of the opening pattern of the second resist mask has been increased, with the mixing ratio of the etching gas containing $CF_4$ and $O_2$ being changed to a third mixing ratio that is different from the second mixing ratio.

13. The method for manufacturing an optical semiconductor device according to claim 11, wherein the second opening has a depth measured from the surface of the buried layer to the principal surface of the semiconductor layer larger than a depth measured from the surface of the buried layer to the upper surface of the mesa structure of the first opening.

* * * * *